United States Patent [19]

Tsukahara et al.

[11] Patent Number: 5,202,409

[45] Date of Patent: Apr. 13, 1993

[54] POLYHYDROXYPHENYLENE ETHER RESIN AND PROCESS FOR PREPARING THE SAME

[75] Inventors: Toru Tsukahara; Mitsutoshi Aritomi; Yusuke Arashiro; Shinichi Yamauchi; Hiromi Nishimura, all of Yokkaichi, Japan

[73] Assignee: Mitsubishi Petrochemical Co., Ltd., Tokyo, Japan

[21] Appl. No.: 799,967

[22] Filed: Nov. 29, 1991

[30] Foreign Application Priority Data

Nov. 29, 1990 [JP] Japan .................................. 2-325793
Aug. 29, 1991 [JP] Japan .................................. 3-218290

[51] Int. Cl.$^5$ ...................... C08L 71/12; C08G 75/00; C08G 65/48
[52] U.S. Cl. .................................. 528/219; 528/212; 528/214; 528/215; 528/217; 528/373; 525/396; 525/905
[58] Field of Search ............... 528/219, 214, 212, 215, 528/217, 374, 375, 373; 525/396, 397, 905, 68, 145

[56] References Cited

U.S. PATENT DOCUMENTS

| 3,257,358 | 6/1966 | Stamatoff | 528/215 |
|---|---|---|---|
| 3,262,892 | 7/1966 | Hay | 528/212 |
| 3,306,874 | 2/1967 | Hay | 528/215 |
| 3,306,875 | 2/1967 | Hay | 528/212 |
| 3,378,505 | 4/1968 | Hay | 528/215 |
| 3,422,062 | 1/1969 | Segal | 528/480 |
| 3,657,167 | 4/1972 | Gramera | 528/374 |
| 4,042,564 | 8/1977 | Bennett, Jr. | 528/216 |
| 4,477,650 | 10/1984 | Mobley | 528/216 |
| 4,537,948 | 8/1985 | Bartmann | 528/215 |
| 4,578,449 | 3/1986 | Mobley | 528/215 |
| 4,642,358 | 2/1987 | Aycock | 549/253 |
| 4,689,389 | 8/1987 | Lee | 528/374 |
| 4,728,712 | 3/1988 | Singh | 528/374 |
| 4,745,157 | 5/1988 | Ruffner | 524/801 |
| 4,820,768 | 4/1989 | Shiraki et al. | 525/66 |
| 4,841,018 | 6/1989 | Gaughan | 528/374 |
| 4,927,889 | 5/1990 | Shiraki | 525/282 |
| 4,972,020 | 11/1990 | Shiraki | 525/57 |
| 5,037,943 | 8/1991 | Shaffer | 528/215 |
| 5,068,310 | 11/1991 | Shaffer | 528/215 |
| 5,084,551 | 1/1992 | Shaffer | 528/219 |
| 5,086,112 | 2/1992 | Togo | 525/396 |
| 5,096,979 | 3/1992 | Brown | 525/905 |

FOREIGN PATENT DOCUMENTS 0055473 7/1982 European Pat. Off. .
1961603 7/1970 Fed. Rep. of Germany .

Primary Examiner—John Kight, III
Assistant Examiner—P. Hampton-Hightower
Attorney, Agent, or Firm—Oblon, Spivak, McClelland, Maier & Neustadt

[57] ABSTRACT

Disclosed is a process for preparing a polyhydroxyphenylene ether resin which comprises copolymerizing a phenol-substituted compound having hydroxyl group as a substituent, represented by the formula (I):

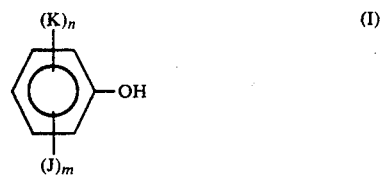

wherein m and n each represents an integer satisfying the formulae $1 \leq m$ and $m+n \leq 4$; J represents $\{(HO\text{-})_a\text{—}R^1\text{—}S\}_b\text{—}R^2\text{—}$ where a and b each represents an integer of 1 to 6; and $R^1$ and $R^2$ each represents unsubstituted or halogen-substituted alkylene, alkenylene or arylene, or alkylene; K represents halogen, primary or secondary alkyl, alkenyl, phenyl, aminoalkyl, haloalkyl, hydrocarbonoxy or halohydrocarbonoxy;

with at least one phenol-substituted compound represented by the formula (II):

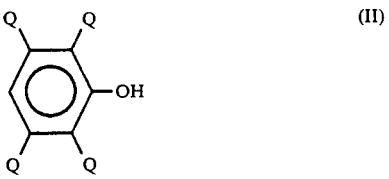

wherein Qs each represents hydrogen, halogen, primary or secondary alkyl, alkenyl, aromatic, aminoalkyl, haloalkyl, hydrocarbonoxy or halohydrocarbonoxy, and a resin composition containing the polyhydroxyphenylene ether resin prepared by the above method.

9 Claims, 2 Drawing Sheets wherein Qs each represents hydrogen, halogen, primary or secondary alkyl, alkenyl, aromatic, aminoalkyl, haloalkyl, hydrocarbonoxy or halohydrocarbonoxy, and a resin composition containing the polyhydroxyphenylene ether resin prepared by the above method.

9 Claims, 2 Drawing Sheets

POLYHYDROXYPHENYLENE ETHER RESIN AND PROCESS FOR PREPARING THE SAME

BACKGROUND OF THE INVENTION

This invention relates to a novel polyhydroxyphenylene ether resin having an optional number of hydroxyl group(s) which is a reactive functional group in the molecule and a process for preparing the same.

More specifically, this invention relates to a process for preparing a novel polyhydroxyphenylene ether resin which comprises subjecting a phenol-substituted compound having hydroxyl group as a substituent to oxidation polymerization or subjecting said compound with another phenol-substituted compound to oxidation copolymerization, and a novel polyhydroxyphenylene ether resin excellent in coating property, plating property, adhesion property and gas barrier property, and useful for lamination and further as a compatibilizing agent of a polymer alloy.

In recent years, demands for resin materials have been diversified and sophisticated so that development of a resin having a reactive functional group has been demanded strongly. This is because, for example, in a non-compatible polymer blend, in order to obtain a polymer blend showing microdispersion form and having firm interfacial strength, it is effective to use, as a compatibilizing agent, a block polymer or a graft polymer having a segment which has affinity to both polymers to be blended. One of the important methods of synthesizing these polymers is a method of bonding polymers each having a functional group reactive with each other.

As a method of functionalizing a polyphenylene ether (hereinafter called "PPE"), there has been known examples of introducing various functional groups using a terminal phenolic hydroxyl group as a reaction site. For example, there are a terminal carboxylic anhydride-modified PPE disclosed in Japanese Provisional Patent Publication No. 199754/1988 or Japanese Provisional PCT Patent Publication No. 500456/1987, a terminal alcoholic hydroxyl-modified PPE disclosed in U.S. Pat. No. 4,744,708 and a terminal glycidyl-modified PPE disclosed in U.S. Pat. No. 4,732,937. However, since in these examples, each number of a reaction site and a functional group is one at most per one molecule of a polymer, said examples cannot be said to be satisfactory in the point of optimum number of functional groups.

One of the effective methods of introducing a functional group is copolymerization with a monomer compound having a functional group. However, in known copolymers until now concerning PPE, a substituent of a main chain benzene ring is confined only to an alkyl group, an alkenyl group, an aromatic group, an oxyalkyl group and a halogen atom.

SUMMARY OF THE INVENTION

An object of the present invention is to provide a novel PPE, namely a polyhydroxyphenylene ether resin, having an optional number of hydroxyl group(s) which is a reactive functional group in the molecule and a process for preparing the same.

The present invention is a process for preparing a polyhydroxyphenylene ether resin which comprises copolymerizing at least one phenol-substituted compound having hydroxyl group as a substituent, represented by the formula (I):

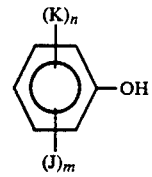

wherein m and n each represents an integer satisfying the formulae $1 \leq m$ and $m+n \leq 4$; J represents $\{(HO)_a-R^1-S\}_b-R^2-$ where a and b each represents an integer of 1 to 6; and $R^1$ and $R^2$ each represents an unsubstituted or halogen-substituted alkylene group having 1 to 20 carbon atoms, an alkenylene group having 1 to 20 carbon atoms or arylene group, or an alkylene group having 1 to 20 carbon atoms and an unsubstituted or halogen-substituted ether linkage; when m is 2 or more, Js may be the same or different, respectively; K represents a halogen atom, a primary or secondary alkyl group, an alkenyl group, phenyl group, an aminoalkyl group, a haloalkyl group, a hydrocarbonoxy group or a halohydrocarbonoxy group; and when n is 2 or more, Ks may be the same or different, respectively, and, if necessary, at least one phenol-substituted compound represented by the formula (II):

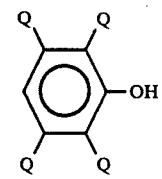

wherein Qs each represents hydrogen atom, a halogen atom, a primary or secondary alkyl group, an alkenyl group, an aromatic group, an aminoalkyl group, a haloalkyl group, a hydrocarbon oxy group or a halohydrocarbon oxy group.

DESCRIPTION OF THE PREFERRED EMBODIMENTS

Figure 1:
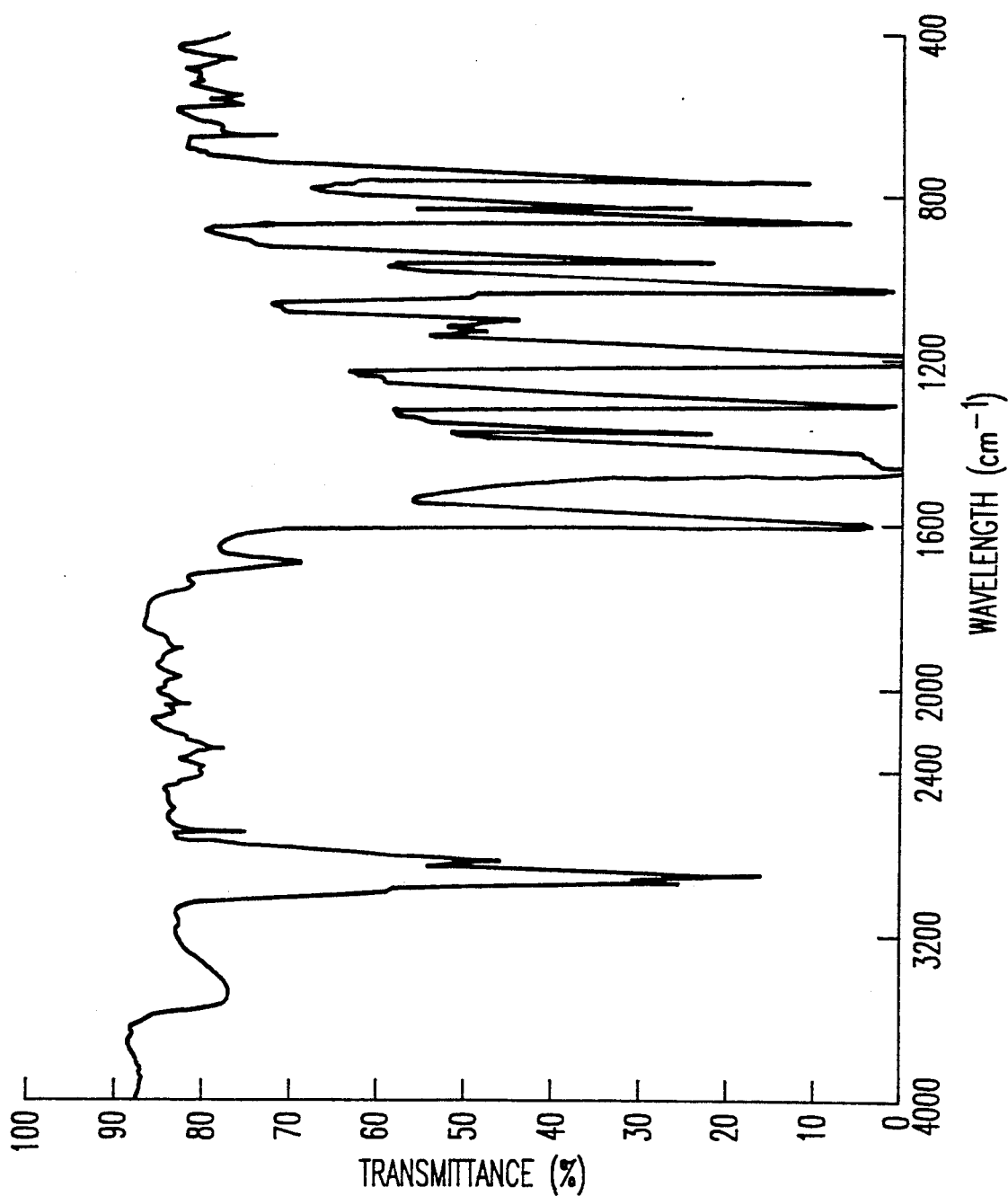
FIG. 1 shows an infrared absorption spectrum of a polyhydroxyphenylene ether resin obtained in Example 2.

In the following, the present invention is explained in detail.

The phenol-substituted compound having hydroxyl group as a substituent to be used in the present invention is represented by the formula (I):

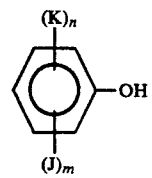

wherein m, n, J and K each have the same meanings as described above.

For describing the substituents J and K specifically, the groups of {(HO)$_a$—R$^1$—S—} represented by J are exemplified in the following Group A, the groups represented by R$^2$ in the following Group B, and the groups represented by K in the following Group C.

Group A: a hydroxyalkylthio group such as hydroxymethylthio, 2-hydroxyethylthio, 3-hydroxypropylthio, 2-hydroxypropylthio, 2,3-dihydroxypropylthio, 2-hydroxy-1-methylethylthio, dimethylhydroxymethylthio, bis(hydroxymethyl)-methylthio, 2-, 3- or 4-hydroxybutylthio, 2-hydroxy-1-ethylethylthio, 2-hydroxy-1-methylpropylthio, 3-hydroxy-1-methylpropylthio, tris(hydroxymethyl)methylthio, 2,2,2-tris(hydroxymethyl)ethylthio, 2-hydroxy-1-hydroxymethylpropylthio, 3-hydroxy-1-hydroxymethylthio, 2,3-dihydroxy-1-hydroxymethylpropylthio, 2-, 3-, 4- or 5-hydroxypentylthio, 2,4- or 3,5-dihydroxypentylthio, 3,4,5,6-tetrahydroxyheptylthio, 6-hydroxyheptylthio, 8-hydroxyoctylthio, 10-hydroxydecylthio, 12-hydroxydodecylthio, 14-hydroxytetradecylthio, 16-hydroxyhexadecylthio, 18-hydroxyoctadecylthio, 20-hydroxyeicosylthio, 2-(2-hydroxyethyloxy)ethylthio, 2-(2,2-bis(hydroxymethyl)ethyloxy)ethylthio, 2-(2,3-dihydroxypropyloxy)ethylthio, 2-(2-hydroxy-1-methylethyloxy)ethylthio, 2-(2-hydroxypropyloxy)ethylthio, 2-(1-chloromethyl-2-hydroxyethyloxy)ethylthio, 2-(1-chloro-2-hydroxypropyloxy)ethylthio and 2-, 3- or 4-hydroxyphenylthio; and a hydroxyarylthio group such as 2,4-, 3,4- or 2,3-dihydroxyphenylthio and 2,4,6-trihydroxyphenylthio.

Group B: an alkylene group such as trimethylene, 1,1-dimethyltrimethylene, isopropylethylene, methylethylene, ethylene and dimethylmethylene.

Group C: a primary or secondary alkyl group such as methyl, ethyl, n-propyl, n-butyl, n-amyl, isoamyl, 2-methylbutyl, n-hexyl, 2,3-dimethylbutyl, 2-, 3- or 4-methylpentyl, heptyl, isopropyl, sec-butyl and 1-methylpentyl; phenyl group; and fluorine atom, chlorine atom and bromine atom.

As a preferred phenol-substituted compound (I) having hydroxyl group as a substituent, there may be exemplified 2-[2-(2-hydroxyethylthio)propyl]-6-methylphenol, 2-[2-(2,3-dihydroxypropylthio)propyl]-6-methylphenol, 2-[2-(2-hydroxy-1-methylpropylthio)propyl]-6-methylphenol, 2-[2-(2-hydroxypropylthio)propyl]-6-methylphenol, 2-[3-(2-hydroxyethylthio)propyl]-6-methylphenol, 2-[3-(2-hydroxypropylthio)propyl]-6-methylphenol, 2-[3-(2,3-dihydroxypropylthio)propyl]-6-methylphenol, 2-[3-(2-hydroxy-1-methylpropylthio)propyl]-6-ethylphenol, 2-[3-(2-hydroxyethylthio)propyl]-6-ethylphenol, 2-[3-(2-hydroxypropylthio)-propyl]-6-ethylphenol, 2-[3-(2,3-dihydroxypropylthio)-propyl]-6-ethylphenol, 2-[3-(2-hydroxy-1-methylpropylthio)-propyl-6-ethylphenol, 2-[3-(2-hydroxyethylthio)-propyl]-6-phenylphenol, 2-[3-(2-hydroxypropylthio)propyl]-6-propylphenol, 2-[3-(2,3-dihydroxypropylthio)propyl]-6-propylphenol, 2-[3-(2-hydroxy-1-methylpropylthio)propyl]-6-propylphenol, 2-[3-(2-hydroxyethylthio)propyl]-6-phenylphenol, 2-[3-(2-hydroxypropylthio)propyl]-6-phenylphenol, 2-[3(2,3-dihydroxypropylthio)propyl]-6-phenylphenol, 2-[3-(2-hydroxy-1-methylpropylthio)propyl]-6-phenylphenol, 2-[2-(2-hydroxyethylthio)-2-(isopropyl)ethyl]-6-methylphenol, 2-[2-(2-hydroxypropylthio)-2-(isopropyl)ethyl]-6-methylphenol, 2-[2-(2,3-dihydroxypropylthio)-2-(isopropyl)ethyl]-6-methylphenol, 2-[2-(2-hydroxy-1-methylpropylthio)-2-(isopropyl)ethyl]-6-methylphenol, 2-[3-(2-methyl-2-hydroxyethylthio)propyl]-6-ethylphenol, 2-[2-(2-hydroxypropylthio)-2-(isopropyl)ethyl]-6-ethylphenol, 2-[2-(2,3-dihydroxypropylthio)-2-(isopropyl)ethyl]-6-ethylphenol, 2-[2-(2-hydroxy-1-methylpropylthio)-2-(isopropyl)-6-ethylphenol, 2-[2-(2-hydroxyethylthio)-2-(isopropyl)ethyl]-6-propylphenol, 2-[2-(2-hydroxypropylthio)-2-(isopropyl)ethyl]-6-propylphenol, 2-[2-(2,3-dihydroxypropylthio)-2-(isopropyl)ethyl]-6-propylphenol, 2-[2-(2-hydroxy-1-methylpropylthio)-2-(isopropyl)ethyl]-6-propylphenol, 2-[2-(2-hydroxyethylthio)-2-(isopropyl)ethyl]-6-phenylphenol, 2-[2-(2-hydroxypropylthio)-2-(isopropyl)ethyl]-6-phenylphenol, 2-[2-(2,3-dihydroxypropylthio)-2-(isopropyl)ethyl]-6-phenylphenol, 2-[2-(2-hydroxy-1-methylpropylthio)-2-(isopropyl)ethyl]-6-phenylphenol, 2-[3-(2-hydroxy-1-methylpropylthio)propyl]-6-methylphenol and 2-[3-(2-hydroxypropylthio)propyl]-6-methylphenol, and among them, 2-[3-(2-hydroxyethylthio)propyl]-6-methylphenol, 2-[3-(2,3-dihydroxypropylthio)propyl]-6-methylphenol, 2-[3-(2-hydroxy-1-methylpropylthio)propyl]-6-methylphenol and 2-[3-(2-hydroxypropylthio)propyl]-6-methylphenol are more preferred. These compounds can be synthesized easily by a known radical addition reaction of thiol to an olefinic double bond (Marvel et al, Journal of Polymer Science, vol. VI, No. 2, pp. 127 to 143). A phenol compound having an olefinic double bond and a thiol compound having hydroxyl group which are starting materials of the above reaction are easily available.

Specific examples of the phenol-substituted compound of the formula (II) to be used in the present invention are described in the following Group D.

Group D: o-, m- or p-cresol, 2,6-, 2,5-, 2,4- or 3,5-dimethylphenol, 2,6-diphenylphenol, 2,6-diethylphenol, 2,3,5- or 2,3,6-trimethylphenol, 2-methyl-6-t-butylphenol, 2-allylphenol, 2,6-diallylphenol, 2-allyl-6-methylphenol, 2-allyl-5-chlorophenol, 2-allyl-3-methoxyphenol, 2-allyl-3-isobutyl-6-methylphenol and 2-allyl-6-ethylphenol.

Among them, 2,6-dimethylphenol, a combination of a large amount of 2,6-dimethylphenol with a small amount of at least one monomer compound selected from 2,3,6-trimethylphenol, o-cresol and p-cresol, 2,6-diallylphenol, 2-allyl-6-methylphenol, 2-allyl-6-ethylphenol and 2-geranyl-6-methylphenol are preferred. Particularly preferred is 2,6-dimethylphenol.

Further, there may be also used a polymer containing the monomer compounds of the formulae (I) and (II) as a main component and a polyvalent hydroxy aromatic compound such as bisphenol A, tetrabromobisphenol A, resorcin, hydroquinone, 2,2-bis(3',5'-dimethyl-4'-hydroxyphenyl)propane, bis(3,5-dimethyl-4-hydroxyphenyl)methane and 3,3',5,5'-tetramethyl-4,4'-dihydroxybiphenyl as a copolymerization component.

Said polymer can be prepared in the same manner as in the conventional oxidation polymerization of PPE. The method is disclosed in, for example, U.S. Pat. No. 3,422,062, U.S. Pat. No. 3,306,874, U.S. Pat. No. 3,306,875, U.S. Pat. No. 3,257,257 and U.S. Pat. No. 3,257,358. The catalyst to be used in the oxidation polymerization is not particularly limited, but may be any catalyst by which a desired polymerization degree can be obtained. In this field of the art, there have been known many catalysts comprising cuprous salt-amine, cupric salt-amine-alkali metal hydroxide or manganese salt-primary amine.

The polyhydroxyphenylene ether resin of the present invention obtained by oxidation copolymerization of one or more phenol-substituted compound having hydroxyl group as a substituent represented by the formula (I) and, if necessary, one or more phenol-substituted compound represented by the formula (II) is a polyhydroxyphenylene ether resin comprising p constitutional units represented by the following formula (III) and q constitutional units represented by the following formula (IV), having a number average polymerization degree of 25 to 400 and satisfying $0.2 \leq 100\ p/(p+q) + 100$:

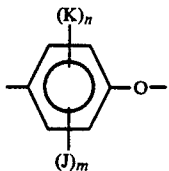
(III)

wherein m represents an integer of 1 to 4; n represents an integer of 0 to 3; and $m+n \leq 4$; Js each represents $(HO)_a$—$R^1$—S—$R^2$— where a represents an integer of 1 to 6; $R^1$ represents an aliphatic polyvalent hydrocarbon group or aromatic polyvalent hydrocarbon group having 1 to 20 carbon atoms which may be discontinued by halogen atom-substituted or unsubstituted oxygen atom; and $R^2$ represents an alkylene group having 1 to 20 carbon atoms; when m is 2 or more, Js may be the same or different, respectively; Ks each independently represents a halogen atom, a primary or secondary alkyl group having 1 to 20 carbon atoms, an alkenyl group having 1 to 20 carbon atoms, phenyl group, an aminoalkyl group having 1 to 20 carbon atoms, a haloalkyl group having 1 to 20 carbon atoms, a hydrocarbonoxy group having 1 to 20 carbon atoms or a halohydrocarbonoxy group; and when n is 2 or more, Ks may be the same or different, respectively,

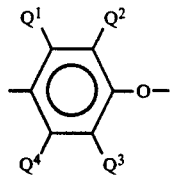
(IV)

wherein $Q^1$, $Q^2$, $Q^3$ and $Q^4$ each independently represent hydrogen atom, a halogen atom, a primary or secondary alkyl group having 1 to 20 carbon atoms, an alkenyl group having 1 to 20 carbon atoms, phenyl group, an aminoalkyl group having 1 to 20 carbon atoms, a haloalkyl group having 1 to 20 carbon atoms, a hydrocarbonoxy group having 1 to 20 carbon atoms or a halo hydrocarbonoxy group.

The particularly preferred polyhydroxyphenylene ether resin is a polyhydroxyphenylene ether having a number average polymerization degree of 25 to 400, represented by the formula (V):

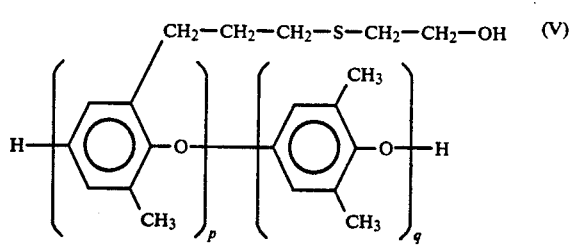

wherein $0.2 \leq 100\ p/(p+q) \leq 100$.

The polyhydroxypheylene ether may be a homopolymer, a random polymer or a block polymer. The number average polymerization degree is 25 to 400. If the value is less than 25, mechanical characteristics of the composition are not good, while if it exceeds 400, molding workability is lowered due to increase in melting viscosity, whereby handling becomes difficult.

Among them, particularly preferred is a random copolymer containing 0.5 to 50 mole %, preferably 1 to 40 mole % of 2-(3-(2-hydroxyethylthio)propyl)-6-methylphenol and 99.5 to 50 mole %, preferably 99 to 60 mole % of 2,6-dimethylphenol. The molecular weight is preferably 3,000 to 50,000, more preferably 5,000 to 30,000 in terms of number average molecular weight.

The thermoplastic resin composition containing 10 to 90% by weight of the polyhydroxyphenylene ether (A) and 90 to 10% by weight of an epoxy group-containing olefin resin (B) is useful as an engineering plastic which provides industrial materials such as automobile components and electrical components excellent in solvent resistance, heat resistant stiffness including a connector, an ignition manifold, a sealing material of a coil, a gear and a crank.

The epoxy group-containing olefin resin which is Component (B) can be prepared by a method of random, block or graft copolymerization of an unsaturated monomer having an epoxy group with an olefin resin.

The olefin type resin comprises at least one α-olefin having 2 to 10 carbon atoms, and may preferably have a crystallization degree at room temperature measured by X ray diffraction of 10% or more, more preferably 20% or more and a melting point of 40° C. or higher. When the crystallization degree is lowered, the modulus of elasticity of a final composition is lowered. Further, the olefin type resin should have a sufficient molecular weight as a resin at ordinary temperature. For example, when propylene is a main component, it is desired that the melt flow rate measured according to JIS-K-6758 is a molecular weight corresponding to 0.01 to 500 g/10 min, preferably 0.05 to 100 g/10 min, and the modulus of elasticity measured according to JIS-K-7203 is 500 kg/cm² or more.

As an example of the above α-olefin which is a constitutional component of the olefin type resin, there may be mentioned ethylene, propylene, butene-1, pentene-1, hexene-1, 3-methylbutene-1, 4-methylpentene-1, 3,3-dimethylpeentene-1, 3-methylehexene-1, 4-methylhexene-1, 4,4-dimethylhexene-1, 5-methylhexene-1, allylcyclopentane, allylcyclohexane, allylbenzene, 3-cyclohexylbutene-1, vinylcyclopropane, vinylcyclohexane, 2-vinylbicyclo(2,2,1)-heptane, heptene-1 and octene-1.

Among them, as a preferred example, there may be mentioned ethylene, propylene, butene-1, pentene-1, hexene-1, 3-methylbutene-1, 4-methylpentene-1 and 3-methylhexene-1. Particularly preferred are ethylene, propylene, butene-1, 3-methylbutene-1 and 4-methylpentene-1. One or more of these α-olefins may be used as a polymerization component.

As the unsaturated monomer having an epoxy group to be used in copolymerization, there may be mentioned, for example, glycidyl methacrylate, butylglycidyl maleate, butylglycidyl fumarate, propylglycidyl maleate and glycidyl acrylate. Among these, glycidyl methacrylate is particularly preferred.

When the copolymerization is carried out, a monomer other than the above unsaturated monomer having an epoxy group, for example, methyl acrylate, methyl methacrylate or vinyl acetate may be also copolymerized in an amount which does not exceed a half amount of the total monomer amount.

Further, the olefin resin (B) of the present invention can be also obtained by graft copolymerization of an olefin type resin with the above unsaturated monomer having an epoxy group under radical polymerization condition.

As the method for effecting the radical reaction, there may be mentioned a method in which radiation such as γ-ray and electron ray is irradiated in the coexistence of the above olefin type resin and the above polymerizable monomer, a method in which the olefin type resin is irradiated with radiation and then a polymerizable monomer is coexisted and a method in which the olefin polymer and a polymerizable monomer are coexisted and heated in the presence or absence of a radical initiator. Any state such as solution state, melting state and suspended state may be employed.

As the radical initiator, there may be used organic and inorganic peroxides such as benzoyl peroxide, t-butyl peroxybenzoate, t-butyl hydroperoxide, t-butyl peroxyacetate, diisopropyl peroxydicarbonate, 2,2-bis(t-butylperoxy)octane, methyl ethyl ketone peroxide, potassium peroxide and hydrogen peroxide; and an azo compound such as α,α'-azobisisobutyronitrile. The peroxide may be used as a redox by combining with a reducing agent. For example, there may be mentioned a combination of hydrogen peroxide and a ferrous salt. These radical initiators may be selected suitably in relation to a modifier and reaction system. Further, two or more radical initiators may be used in combination.

The amount of the radical initiator to be used is 0 to 100 parts by weight, preferably in the range of 0 to 30 parts by weight based on 100 parts by weight of the above olefin type resin.

The temperature at the time of graft copolymerization is generally 30° to 350° C., preferably in the range of 50° to 300° C. The modification reaction time is 50 hours or shorter, preferably in the range of 1 minute to 24 hours.

Composition

In the resin composition of the present invention, the composition ratio of the polyhydroxyphenylene ether (A) to the epoxy group-containing olefin resin (B) in a two component-system is in the range of from 10:90 to 90:10, preferably in the range of from 20:80 to 80:20, more preferably in the range of from 30:70 to 70:30 in terms of the weight ratio of Component (A) to Component (B) from the standpoint of balance of mechanical strength, molding property and solvent resistance. If the polyhydroxyphenylene ether (A) is less than 10% by weight, the effects of improving heat resistance and stiffness property are small as compared with those of the olefin resin, while if it exceeds 90% by weight, the effects of improving molding property and solvent resistance are small as compared with those of the polyphenylene ether resin.

The thermoplastic resin composition of the present invention may contain components other than Components (A) and (B) described above. For example, a part (up to 80% by weight) of the polyhydroxyphenylene ether (A) may be replaced with an unmodified polyphenylene ether. Also, a part (up to 85% by weight if the epoxy group content in the olefin resin is 0.1 mole % or more) of the epoxy-group containing olefin resin (B) may be replaced with an unmodified olefin type resin.

In the resin composition, 20% by weight or less of an antioxicant, a weatherability improving agent, a nucleating agent, a flame-retardant, a plasticizer and a flowability improving agent may be contained. Further, 50% by weight or less of an organic or inorganic filler such as glass fiber, mica, talc, wallastonite, potassium titanate, calcium carbonate and silica, and 5% by weight or less of a dispersant of a coloring agent may be also contained. Furthermore, 5 to 30% by weight of an impact strength modifier, for example, a styrene-butadiene copolymer rubber and a hydride thereof, an ethyelene-propylene-(diene) copolymer rubber and also α,β-unsaturated carboxylic anhydride-modified compounds of these may be contained.

Preparation Method and Molding Method of Composition

As a melting and kneading method for obtaining the thermoplastic resin composition of the present invention, there may be used suitably a kneading method generally used practically in a thermoplastic resin. For example, the respective powdery or granular components, if necessary, together with additives mentioned in the description of the additive components can be mixed uniformly by using a Henschel mixer, a ribbon blender or a V-shaped blender, and then kneaded by a single axis or plural axis kneading extruder, a roll or a Banbury mixer.

The molding method of the thermoplastic resin composition of the present invention is not particularly limited, and there may be applied suitably a molding method generally used in a thermoplastic resin, namely, injection molding, blow molding, extrusion molding, sheet molding, thermal molding, rotational molding, laminate molding and press molding.

EXAMPLES

For describing the present invention in detail, Examples are shown below, but the present invention is not limited to these.

In the following, "part" and "%" mean "part by weight" and "% by weight", respectively. The amount of hydroxyl group contained in the resin was represented in mole % based on a recurring unit of the main chain phenylene ring, and calculated from integrated strength of a signal derived from a methylene group bonded to hydroxyl group at around 3.6 ppm by $^1$H-NMR. The number average molecular weight (hereinafter abbreviated as "Mn") and the molecular weight distribution value (hereinafter abbreviated as "Q value") are values calculated on polystyrene measured according to GPC (gel permeation chromatography).

SYNTHETIC EXAMPLE 1

Under nitrogen gas atmosphere, 496 parts of 2-allyl-6-methylphenol and 392 parts of 2-mercaptoethanol were dissolved in 785 parts of ethanol. To the solution was added dropwise 1,600 parts of an ethanol solution containing 1.9% of α,α'-azobisisobutyronitrile at a reflux temperature, and the mixture was reacted for 10 hours. After ethanol was removed by an evaporator, the resulting material was elevated to 110° C. under vacuum to remove unreacted 2-mercaptoethanol and 2-hydroxyethyl disulfide which is a by-product whereby the desired 2-[3-(2-hydroxyethylthio)propyl]-6-methylphenol was obtained.

Reaction degree of allyl group: to 100%
Selectivity of reaction: to 100%

SYNTHETIC EXAMPLE 2

In the same manner as in Synthetic example 1, 2-allyl-6-methylphenol and 3-mercapto-1,2-propanediol were reacted to obtain 2-[3-(2,3-dihydroxypropylthio)propyl]-6-methylphenol.

Reaction degree of allyl group: 93%
Selectivity of reaction: about 100%

SYNTHETIC EXAMPLE 3

In the same manner as in Synthetic example 1, 2-allyl-6-methylphenol and 3-mercapto-2-butanol were reacted to obtain 2-[3-(2-hydroxy-1-methylpropylthio)propyl]-6-methylphenol.

Reaction degree of allyl group: 94%
Selectivity of reaction: about 100%

SYNTHETIC EXAMPLE 4

In the same manner as in Synthetic example 1, 2-allyl-6-methylphenol and 1-mercapto-2-propanol were reacted to obtain 2-[3-(2-hydroxypropylthio)propyl]-6-methylphenol.

Reaction degree of allyl group: 94%
Selectivity of reaction: about 100%

EXAMPLE 1

In 2,890 parts of xylene and 766 parts of methanol were dissolved 92 parts of the phenol-substituted compound obtained in Synthetic example 1, 952 parts of 2,6-xylenol and 20 parts of sodium hydroxide. Subsequently, to the solution were added 40 parts of diethanolamine, 12.6 parts of dibutylamine and 0.96 part of manganese chloride tetrahydrate dissolved in 316 parts of methanol in this order. The polymerization reaction was divided into two steps. In the former step, the polymerization was carried out while maintaining a temperature at 40° C. and introducing oxygen gas at a flow rate of 0.8 liter/min, until solids were precipitated. In the latter step, the reaction was carried out while maintaining a temperature at 30° C. and introducing oxygen gas at a flow rate of 0.8 liter/min and nitrogen gas at a flow rate of 8 liter/min, until precipitation of the polymer was terminated. After the polymer was washed with methanol which was made acidic with hydrochloric acid to deactivate the catalyst, the desired polyhydroxyphenylene ether resin was obtained.

Yield: 91%
Hydroxyl group content: 3.0 mole %
Mn: 23,100
Q value: 2.24

EXAMPLE 2

Figure 2:
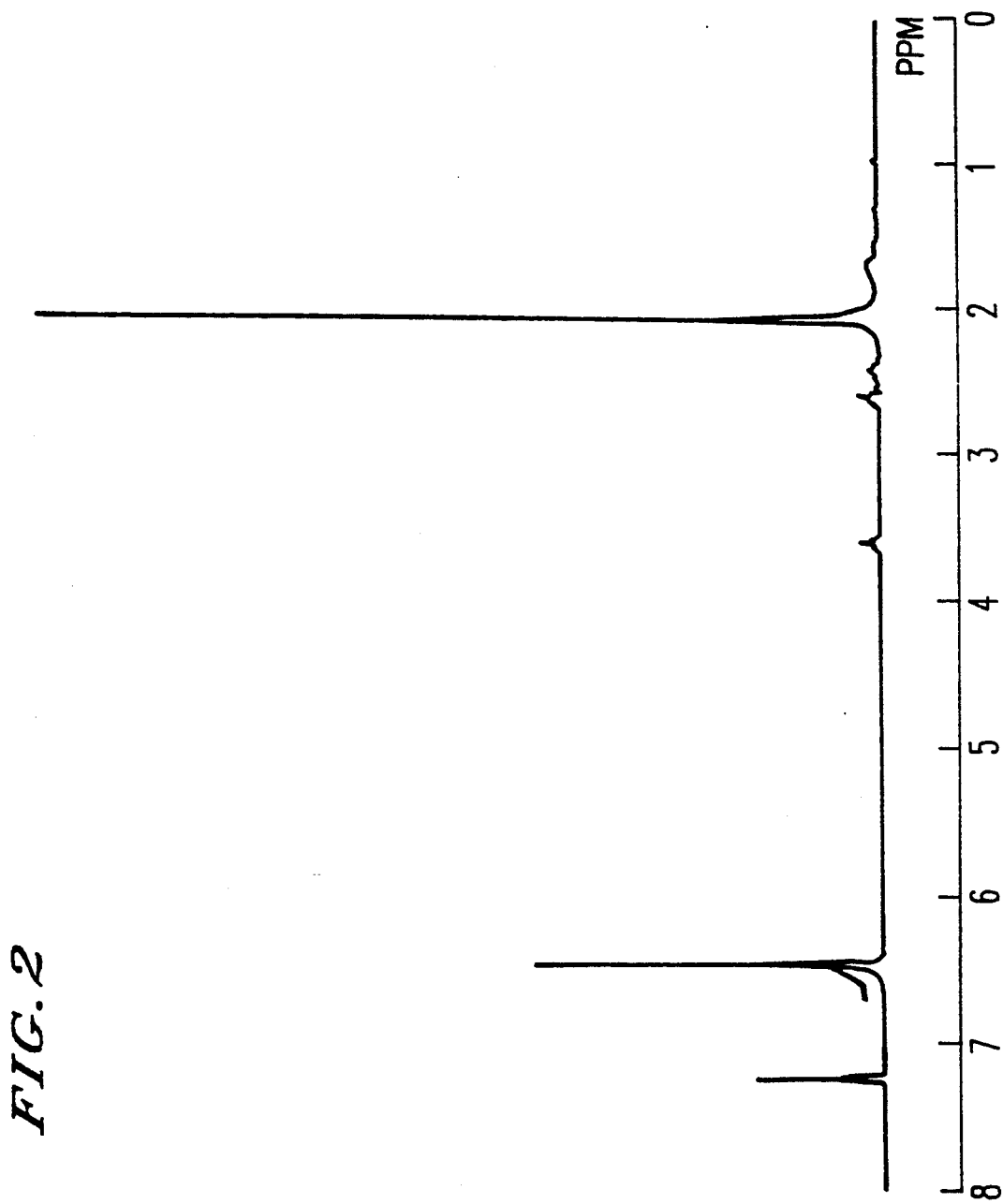
FIG. 2 is a $^1$H-NMR chart of a polyhydroxyphenylene ether resin obtained in Example 2.

The procedures were carried out under the same conditions as in Example 1 except for using 192 parts of the phenol-substituted compound obtained in Synthetic example 1 and 900 parts of 2,6-xylenol. The infrared absorption spectrum of the polyhydroxyphenylene ether resin obtained is shown in FIG. 1, and the $^1$H-NMR chart is shown in FIG. 2.

Yield: 94%
Hydroxyl group content: 8.6 mole %
Mn: 30,300
Q value: 2.41

EXAMPLE 3

The procedures were carried out under the same conditions as in Example 1 except for using 74 parts of the phenol-substituted compound obtained in Synthetic example 1 and 960 parts of 2,6-xylenol.

Yield: 90%
Hydroxyl group content: 2.4 mole %
Mn: 9,950
Q value: 1.84

EXAMPLE 4

The procedures were carried out under the same conditions as in Example 1 except for using 55.5 parts of the phenol-substituted compound obtained in Synthetic example 1, 970 parts of 2,6-xylenol, 9.1 parts of sodium hydroxide, 20.5 parts of diethanolamine and 0.48 part of manganese chloride tetrahydrate.

Yield: 91%
Hydroxyl group content: 1.5 mole %
Mn: 10,300
Q value: 1.81

EXAMPLE 5

The procedures were carried out under the same conditions as in Example 4 except for using 148.3 parts of the phenol-substituted compound obtained in Synthetic example 1 and 921 parts of 2,6-xylenol.

Yield: 87%
Hydroxyl group content: 4.9 mole %
Mn: 5,620
Q value: 1.84

EXAMPLE 6

The procedures were carried out under the same conditions as in Example 1 except for using 84 parts of the phenol-substituted compound obtained in Synthetic example 2 and 962 parts of 2,6-xylenol.

Yield: 94%
Hydroxyl group content: 2.0 mole %
Mn: 30,900
Q value: 2.34

EXAMPLE 7

The procedures were carried out under the same conditions as in Example 1 except for using 104 parts of the phenol-substituted compound obtained in Synthetic example 3 and 950 parts of 2,6-xylenol.

Yield: 94%
Hydroxyl group content: 2.7 mole %
Mn: 26,300
Q value: 2.53

EXAMPLE 8

The procedures were carried out under the same conditions as in Example 1 except for using 98 parts of the phenol-substituted compound obtained in Synthetic example 4 and 950 parts of 2,6-xylenol.

Yield: 95%
Hydroxyl group content: 3.8 mole %
Mn: 28,100

Q value: 2.81

EXAMPLE 9

In 2,890 parts of xylene and 766 parts of methanol were dissolved 111 parts of 2-[(2-hydroxyethylthio)propyl]-6-methylphenol obtained in Synthetic example 1, 949 parts of 2,6-xylenol and 9.1 parts of sodium hydroxide.

Subsequently, to the solution were added 20.5 parts of diethanolamine, 12.6 parts of dibutylamine and 0.48 part of manganese chloride tetrahydrate dissolved in 316 parts of methanol in this order.

The polymerization reaction was divided into two steps. In the former step, the reaction was carried out while maintaining a temperature at 40° C. and introducing oxygen gas at a flow rate of 0.8 liter/min, until solids were precipitated. In the latter step, the reaction was carried out while maintaining a temperature at 30° C. and introducing oxygen gas at a flow rate of 0.8 liter/min and nitrogen gas at a flow rate of 8 liter/min, until precipitation of the polymer was terminated.

After the polymer was washed with methanol which was made acidic with hydrochloric acid to deactivate the catalyst, the desired polyhydroxyphenylene ether resin was obtained.

The product formed had a yield of 93%, a hydroxyl group content of 4.6 mole %, a number average molecular weight of 14,930 and a Q value of 2.79. The amount of hydroxyl group contained in the resin was represented in mole % based on a recurring unit of the main chain phenylene ring, and calculated from integrated strength of a signal derived from a methylene group bonded to hydroxyl group at around 3.6 ppm by $^1$H-NMR. The number average molecular weight and the Q value (an index of molecular weight distribution, a ratio of a weight average molecular weight to a number average molecular weight) are values calculated on polystyrene measured according to GPC method.

The resin obtained was called Modified PPE-1.

EXAMPLE 10

The procedures were carried out under the same conditions as in Example 9 except for 55.5 parts of 2-[(2-hydroxyethylthio)propyl]-6-methylphenol, 970 parts of 2,6-xylenol, 9.1 parts of sodium hydroxide, 20.5 parts of diethanolamine and 0.48 part of manganese chloride tetrahydrate.

The yield was 91%, the hydroxyl group content 1.5 mole %, the number average molecular weight 10,300 and the Q value 1.81, respectively.

The resin obtained was called Modified PPE-2.

EXAMPLE 11

The procedures were carried out under the same conditions as in Example 9 except for using 148.3 parts of 2-[(2-hydroxyethylthio)propyl]-6-methylphenol and 921 parts of 2,6-xylenol.

The yield was 87%, the hydroxyl group content 4.9 mole %, the number average molecular weight 5,620 and the Q value 1.84, respectively.

The resin obtained was called Modified PPE-3.

Epoxy Group-containing Olefin Resin

Synthesis of Epoxy Group-containing Polypropylene

In a glass flask with a 5 liter stirrer having previously been replaced sufficiently with nitrogen were charged 150 g of polypropylene homopolymer powder (the melt flow rate (MFR) at 230° C. measured according to ASTM D1238: 1 g/10 min) and 300 g of glycidyl methacrylate, and 3 liters of xylene was charged therein. The mixture was heated to 130° C. and stirred to be dissolved completely.

To the solution was added dropwise 7.5 g of benzoyl peroxide dissolved in 150 ml of xylene over one hour. After completion of the dropwise addition, the mixture was further reacted for one hour.

The operation of pouring the reaction mixture obtained into 10 liter of acetone to precipitate the product formed, removing the product precipitated by filtration and washing, was carried out three times, followed by drying under reduced pressure, to obtain the desired epoxy group-containing polypropylene.

The constitutional unit amount of the epoxy group-containing polypropylene based on glycidyl methacrylate was found to be 1.6% by weight by the infrared spectral analysis. MFR was 5.1 g/10 min. The resin obtained was called Epoxy-modified PP.

Epoxy Group-containing Polyethylene

An ethylene-glycidyl methacrylate copolymer (trade name: Bond Fast Resist-E) produced by Sumitomo Kagaku Kogyo K. K. was used. In Table 1, the above copolymer is abbreviated as Epoxy-modified PE.

Unmodified Olefin Resin

A polypropylene (trade name: Mitsubishi Polypro MA3, MFR measured at 230° C.: 10 g/10 min (abbreviated as PP in Table 1)) and a low density polyethylene (trade name: Mitsubishi Polyethy ZF-60, MFR measured at 190° C.: 1 g/10 min (abbreviated as "PE" in Table 1)) produced by Mitsubishi Petrochemical Co., Ltd. were used.

Polyphenylene Ether

Poly(2,6-dimethyl-1,4-phenylene ether) produced by Nippon Polyether K. K. having a intrinsic viscosity measured in chloroform at 30° C. of 0.31 dl/g was used (abbreviated as "PPE" in Table 1).

Application Examples 1 to 7 and Comparative Application Examples 1 to 4

By using the polyhydroxyphenylene ethers obtained in Examples 9, 10 and 11 and the epoxy group-containing olefin resins, and according to the composition ratios shown in Table 1, the respective components were kneaded at 280° C. at a rotation of 180 for 5 minutes by using a Labo Plastomill kneader (trade name) manufactured by Toyo Seiki Seisakusho, followed by pulverization, to obtain granular resin compositions.

The characteristics of the resin compositions obtained were measured and evaluated according to the following methods. The measurement results are shown in Table 1.

(1) Flexural Modulus

A sheet having a thickness of 2 mm was obtained by pressure molding at 280° C. using a hydraulic press molding machine manufactured by Toyo Seiki Seisakusho, and then cut into a test strip having a width of 15 mm and a length of 80 mm. The cantilever flexural modulus of the test strip at 23° C. at a bending angle of 10 was measured according to JIS K-7106.

(2) Impact Resistance

A test strip having a length of 31.5 mm, a width of 6.2 mm and a thickness of 3.2 mm was injection molded at a temperature of 280° C. by using a CS-183MMX Minimax injection molding machine (trade name) manufactured by Custom Scientific Co., and the Izod impact strength without notch at 23° C. was measured by using a Minimax Izod impact testing machine Model CS-138TI (trade name) manufactured by Custom Scientific Co.

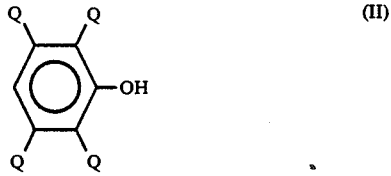

wherein Qs each represents a hydrogen atom, a halogen atom, a primary or secondary alkyl group, an

TABLE 1

|  | Application example | | | | | | | Comparative application example | | | |
| --- | --- | --- | --- | --- | --- | --- | --- | --- | --- | --- | --- |
|  | 1 | 2 | 3 | 4 | 5 | 6 | 7 | 1 | 2 | 3 | 4 |
| Formulation composition (% by weight) | | | | | | | | | | | |
| Modified PPE-1 | 50 | — | — | — | — | — | — | — | — | — | — |
| Modified PPE-2 | — | 50 | — | 30 | 70 | 50 | 80 | — | — | — | — |
| Modified PPE-3 | — | — | 25 | — | — | — | — | — | — | — | — |
| PPE | — | — | 25 | — | — | — | — | 50 | 50 | 50 | 80 |
| Modified PP | 50 | 50 | 50 | 50 | 30 | — | — | — | — | — | — |
| Modified PE | — | — | — | — | — | 50 | 20 | — | — | 50 | 20 |
| PP | — | — | — | 20 | — | — | — | 50 | — | — | — |
| PE | — | — | — | — | — | — | — | — | 50 | — | — |
| Physical properties | | | | | | | | | | | |
| Flexural modulus (kg/cm$^2$) | 14,200 | 15,200 | 15,000 | 13,600 | 15,800 | 4,200 | 12,100 | 14,000 | 5,400 | Impossible to mold | 11,600 |
| Izod impact strength (no notch) (kg · cm/cm$^2$) | 8.8 | 9.7 | 10.2 | 25.5 | 15.2 | 70 or more (not broken) | 70 or more (not broken) | 5.2 | 26 | due to poor flowing | 57 |

We claim:

1. A process for preparing a polyhydroxyphenylene ether resin which comprises subjecting to oxidation polymerization at least one phenol-substituted compound represented by the formula (I):

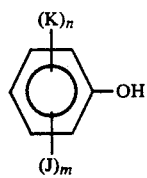

wherein m and n each represents an integer satisfying the formulae $1 \leq m$ and $m+n \leq 4$; J represents $\}(HO)_a\text{—}R^1\text{—}S\}_b\text{—}R^2\text{—}$ where a and b each represents an integer of 1 to 6; and $R^1$ and $R^2$ each represents an unsubstituted or halogen-substituted alkylene group having 1 to 20 carbon atoms, an alkenylene group having 1 to 20 carbon atoms or arylene group, or an alkylene group having 1 to 20 carbon atoms and having an unsubstituted or halogen-substituted ether linkage; when m is 2 or more, J may be the same or different; K represents a halogen atom, a primary or secondary alkyl group, an alkenyl group, phenyl group, an aminoalkyl group, a haloalkyl group, a hydrocarbonoxy group or a halohydrocarbonoxy group; and when n is 2 or more, K may be the same or different with at least one phenol-substituted compound represented by the formula (II):

alkenyl group, an aromatic group, an aminoalkyl group, a haloalkyl group, a hydrocarbon oxy group or a halohydrocarbon oxy group in the presence of the catalyst selected from a group consisting of cuprous salt-amine catalysts, cupric salt-amine - alkali metal hydroxide catalysts and manganese salt-primary amine catalysts.

2. The process according to claim 1, wherein the phenol-substituted compound represented by the formula (I) is a compound selected from the group consisting of 2-[3-(2-hydroxyethylthio)propyl]-6-methylphenol, 2-[3-(2-hydroxy-1-methylpropylthio)propyl]-6-methylphenol, 2-[3-(2,3-dihydroxypropylthio)propyl]-6-methylphenol and 2-[3-(2-hydroxypropylthio)propyl]-6-methylphenol.

3. The process according to claim 1, wherein said polyhyroxyphenylene ether is a polyhydroxyphenylene ether resin consisting of a constitutional unit represented by the following formula (III) with a number of p and a constitutional unit represented by the following formula (IV) with a number of q, having a number average polymerization degree of 25 to 400 and satisfying $0.2 \leq 100 \, p/(p+q) \leq 100$:

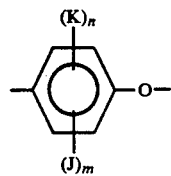

wherein m represents an integer of 1 to 4; n represents an integer of 0 to 3; and $m+n \leq 4$; J represents (HO)$_a$—R$^1$—S—R$^2$— where a represents an integer of 1 to 6; R$^1$ represents an aliphatic polyvalent hydrocarbon group or aromatic polyvalent hydrocarbon group having 1 to 20 carbon atoms which may be discontinued by halogen atom-substituted or unsubstituted oxygen atom; and R$^2$ represents an alkylene group having 1 to 20 carbon atoms; when m is 2 or more, Js may be the same or different, respectively; Ks each represents a halogen atom, a primary or secondary alkyl group having 1 to 20 carbon atoms, an alkenyl group having 1 to 20 carbon atoms, phenyl group, an aminoalkyl group having 1 to 20 carbon atoms, a haloalkyl group having 1 to 20 carbon atoms, a hydrocarbonoxy group having 1 to 20 carbon atoms or a halohydrocarbonoxy group; and when n is 2 or more, Ks may be the same or different, respectively,

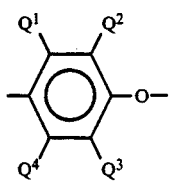
(IV)

wherein Q$^1$, Q$^2$, Q$^3$ and Q$^4$ each represents hydrogen atom, a halogen atom, a primary or secondary alkyl group having 1 to 20 carbon atoms, an alkenyl group having 1 to 20 carbon atoms, phenyl group, an aminoalkyl group having 1 to 20 carbon atoms, a haloalkyl group having 1 to 20 carbon atoms, a hydrocarbonoxy group having 1 to 20 carbon atoms or a halohydrocarbonoxy group.

4. The process according to claim 1, wherein said polyhydroxyphenylene ether resin is a polyhydroxyphenylene ether resin having a number average polymerization degree of 25 to 400 and represented by the formula (V):

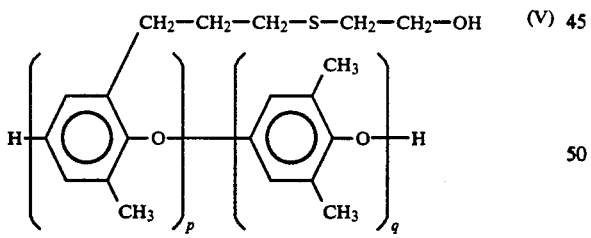

wherein $0.5 \leq 100 \text{ p}/(\text{p}+\text{q}) \leq 100$.

5. A resin composition which comprises 10 to 90% by weight of a polyhydroxyphenylene ether which is the following Component (A) and 90 to 10% by weight of an epoxy group-containing olefin resin which is the following Component (B):

Component (A): A polyhydroxyphenylene ether comprising a constitutional unit represented by the following formula (III) with a number of p and a constitutional unit represented by the following formula (IV) with a number of q, having a number average polymerization degree of 25 to 400 and satisfying $0.2 \leq 100 \text{ p}/(\text{p}+\text{q}) \leq 100$:

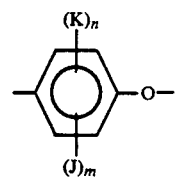
(III)

wherein m represents an integer of 1 to 4; n represents an integer of 0 to 3; and m+n≦4; J represents (HO)$_a$—R$^1$—S—R$^2$— where a represents an integer of 1 to 6; R$^1$ represents an aliphatic polyvalent hydrocarbon group or aromatic polyvalent hydrocarbon group having 1 to 20 carbon atoms which may be discontinued by halogen atom-substituted or unsubstituted oxygen atom; and R$^2$ represents an alkylene group having 1 to 20 carbon atoms; when m is 2 or more, Js may be the same or different, respectively; Ks each represents a halogen atom, a primary or secondary alkyl group having 1 to 20 carbon atoms, an alkenyl group having 1 to 20 carbon atoms, phenyl group, an aminoalkyl group having 1 to 20 carbon atoms, a haloalkyl group having 1 to 20 carbon atoms, a hydrocarbonoxy group having 1 to 20 carbon atoms or a halohydrocarbonoxy group; and when n is 2 or more, Ks may be the same or different, respectively,

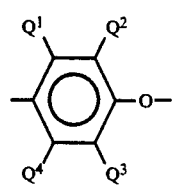
(IV)

wherein Q$^1$, Q$^2$, Q$^3$ and Q$^4$ each represents hydrogen atom, a halogen atom, a primary or secondary alkyl group having 1 to 20 carbon atoms, an alkenyl group having 1 to 20 carbon atoms, phenyl group, an aminoalkyl group having 1 to 20 carbon atoms, a haloalkyl group having 1 to 20 carbon atoms, a hydrocarbonoxy group having 1 to 20 carbon atoms or a halohydrocarbonoxy group; and Component B: An epoxy group-containing olefin type resin obtained by copolymerizing an unsaturated monomer having an epoxy group to an olefin type resin and comprising 0.1 to 20 mole % of an epoxy group unit.

6. The composition according to claim 5, wherein the polyhydroxyphenylene ether resin of Component (A) is a polyhydroxyphenylene ether resin having a number average polymerization degree of 25 to 400, represented by the formula (V):

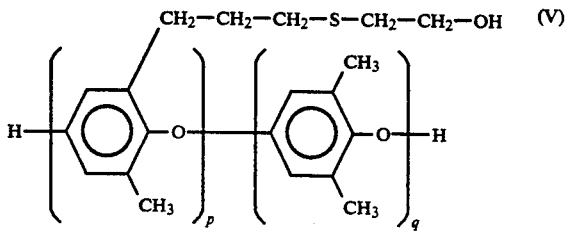

wherein $0.5 \leq 100\ p/(p+q) \leq 100$.

7. The process according to claim 2, wherein the phenol-substituted compound represented by the formula (II) is 2,6-dimethylphenol.

8. The process according to claim 1, wherein said polyhydroxyphenylene ether is a polyhydroxyphenylene ether resin consisting of a constitutional unit represented by the following formula:

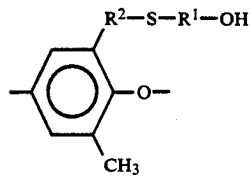

wherein $R^1$ and $R^2$ each represent an alkylene group having 1 to 20 carbon atoms with a number of p, and a constitutional unit represented by the following formula:

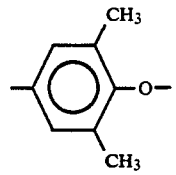

with a number of q, having a number average polymerization degree of 25 to 400 and satisfying $0.2 \leq 100\ p/(p+q) \leq 100$.

9. The process according to claim 1, wherein said oxidation polymerization is carried out at a temperature of from about 30° to about 40° C.

* * * * *